United States Patent
Yang

(10) Patent No.: US 8,143,822 B2
(45) Date of Patent: Mar. 27, 2012

(54) BIDIRECTIONAL UNEQUAL SPEED ELECTRIC MOTOR DRIVEN BIDIRECTIONAL OUTPUT SYSTEM

(76) Inventor: Tai-Her Yang, Dzan-Hwa (TW)

( * ) Notice: Subject to any disclaimer, the term of this patent is extended or adjusted under 35 U.S.C. 154(b) by 321 days.

(21) Appl. No.: 12/382,372

(22) Filed: Mar. 16, 2009

(65) Prior Publication Data

US 2010/0156213 A1 Jun. 24, 2010

Related U.S. Application Data

(63) Continuation-in-part of application No. 12/314,950, filed on Dec. 19, 2008.

(51) Int. Cl.
H02P 3/00 (2006.01)

(52) U.S. Cl. ........ 318/280; 318/282; 318/286; 318/139; 180/65.2; 477/3; 477/16

(58) Field of Classification Search .................. 318/139, 318/280, 282, 283, 432, 439, 286; 180/65.265, 180/65.275, 65.2; 475/5; 477/5, 15, 3, 16
See application file for complete search history.

(56) References Cited

U.S. PATENT DOCUMENTS

| | | | | |
|---|---|---|---|---|
| 5,970,872 A * | 10/1999 | Iwamoto et al. | ............... | 101/423 |
| 7,156,780 B1 * | 1/2007 | Fuchs et al. | ...................... | 482/92 |
| 7,352,143 B2 * | 4/2008 | Inaba et al. | ................... | 318/139 |
| 7,572,201 B2 * | 8/2009 | Supina et al. | ...................... | 475/5 |
| 7,575,078 B2 * | 8/2009 | Muta et al. | ............... | 180/65.265 |
| 7,617,896 B2 * | 11/2009 | Ogata | ........................... | 180/65.7 |
| 7,626,382 B2 * | 12/2009 | Endo et al. | ............... | 324/207.25 |
| 7,672,770 B2 * | 3/2010 | Inoue et al. | ...................... | 701/70 |
| 7,695,387 B2 * | 4/2010 | Oba | .................. | 475/5 |
| 7,771,310 B2 * | 8/2010 | Tanishima | ....................... | 477/5 |
| 7,854,680 B2 * | 12/2010 | Sugai et al. | ..................... | 477/15 |
| 7,878,281 B2 * | 2/2011 | Tanishima | ............... | 180/65.265 |
| 7,954,581 B2 * | 6/2011 | Tanishima | ............... | 180/65.275 |
| 2003/0074115 A1 * | 4/2003 | Yamaguchi et al. | ............. | 701/22 |
| 2003/0173934 A1 * | 9/2003 | Arimitsu | ........................ | 322/34 |
| 2003/0181276 A1 * | 9/2003 | Minagawa et al. | ................ | 475/5 |
| 2003/0232678 A1 * | 12/2003 | Yamauchi et al. | ................. | 475/5 |
| 2004/0079564 A1 * | 4/2004 | Tabata | ........................ | 180/65.2 |
| 2004/0249524 A1 * | 12/2004 | Ozeki et al. | ..................... | 701/22 |
| 2005/0107199 A1 * | 5/2005 | Minagawa | ........................ | 475/5 |
| 2005/0133286 A1 * | 6/2005 | Oshidari | ....................... | 180/65.2 |
| 2006/0217229 A1 * | 9/2006 | Ogata | ............................. | 477/5 |
| 2007/0093341 A1 * | 4/2007 | Supina et al. | ...................... | 475/5 |
| 2007/0103106 A1 * | 5/2007 | Iwanaka et al. | ................ | 318/432 |
| 2007/0205036 A1 * | 9/2007 | Ogata et al. | ................... | 180/337 |
| 2007/0205735 A1 * | 9/2007 | Kiuchi et al. | .................. | 318/432 |
| 2007/0216312 A1 * | 9/2007 | Ogata et al. | .................... | 315/131 |
| 2007/0219045 A1 * | 9/2007 | Ogata et al. | ...................... | 477/3 |
| 2007/0221421 A1 * | 9/2007 | Tanishima | .................... | 180/65.2 |

(Continued)

*Primary Examiner* — Paul Ip
(74) *Attorney, Agent, or Firm* — Bacon & Thomas, PLLC

(57) ABSTRACT

The present invention discloses that the output end of the bidirectional unequal speed electric motor being particularly used to provide bidirectional rotating input is transmitted to the input end of bidirectional same or different speed change ratio output transmission device, and is through the output end of the bidirectional same or different speed change ratio output transmission device to further provide bidirectional rotating output for driving the rotating load, wherein the user is through operatively controlling the rotating speed and operating direction of the bidirectional unequal speed electric motor to change the driving input direction thereby allowing the bidirectional same or different speed change ratio output transmission device having different speed change ratio to provide same or different speed change ratio bidirectional rotating output in different driving input direction and different rotating speed.

13 Claims, 3 Drawing Sheets

U.S. PATENT DOCUMENTS

| | | | |
|---|---|---|---|
| 2007/0225113 A1* | 9/2007 | Ogata | 477/3 |
| 2007/0227790 A1* | 10/2007 | Tanishima | 180/65.2 |
| 2007/0255477 A1* | 11/2007 | Okuda et al. | 701/93 |
| 2007/0259755 A1* | 11/2007 | Tanishima | 477/3 |
| 2007/0275818 A1* | 11/2007 | Kouno | 477/3 |
| 2007/0278022 A1* | 12/2007 | Tanishima | 180/65.2 |
| 2008/0012551 A1* | 1/2008 | Endo et al. | 324/173 |
| 2008/0070745 A1* | 3/2008 | Ogata | 477/15 |
| 2008/0188346 A1* | 8/2008 | Sugai et al. | 477/15 |
| 2008/0224560 A1* | 9/2008 | Yoshida et al. | 310/184 |
| 2009/0133947 A1* | 5/2009 | Yoshihara et al. | 180/65.285 |

* cited by examiner

# BIDIRECTIONAL UNEQUAL SPEED ELECTRIC MOTOR DRIVEN BIDIRECTIONAL OUTPUT SYSTEM

This application is a Continuation-in-Part of nonprovisional application Ser. No. 12/314,950, filed Dec. 19, 2008.

BACKGROUND OF THE INVENTION (a) Field of the Invention

The present invention is through the power of the power source to drive the bidirectional unequal speed electric motor for bidirectional positive or reverse rotation via bidirectional unequal speed electric motor operative control device to further drive the input end of bidirectional same or different speed change ratio output transmission device, and it is further through the output end of the bidirectional same or different speed change ratio output transmission device to operate different speed change ratio bidirectional rotating output while in different driving input direction to drive the rotating load, wherein the present invention can be applied in the bidirectional unequal speed electric motor driven carriers such as electric bicycles, electric motorcycles, or electric vehicles, or electric industrial machineries, tool machineries, or various electric tools or other electric motor driven loads.

(b) Description of the Prior Art

Beside of operatively controlling the bidirectional unequal speed electric motor for speed change, the bidirectional variable speed driving output of conventional bidirectional unequal speed electric motor driving system is usually required to be accomplished by a CVT or shift-change methods, therefore the structure is complicated with high cost but poor transmission efficiency.

SUMMARY OF THE INVENTION

The present invention discloses that the output end of the bidirectional unequal speed electric motor being particularly used to provide bidirectional rotating input is transmitted to the input end of the bidirectional same or different speed change ratio output transmission device, and is through the output end of the bidirectional same or different speed change ratio output transmission device to further provide bidirectional rotating output for driving the rotating load, wherein the user is through operatively controlling the rotating speed and operating direction of the bidirectional unequal speed electric motor to change the driving input direction thereby allowing the bidirectional same or different speed change ratio output transmission device having different speed change ratio to provide same or different speed change ratio bidirectional rotating output while in different driving input direction and different rotating speed.

DESCRIPTION OF MAIN COMPONENT SYMBOLS

Figure 1:
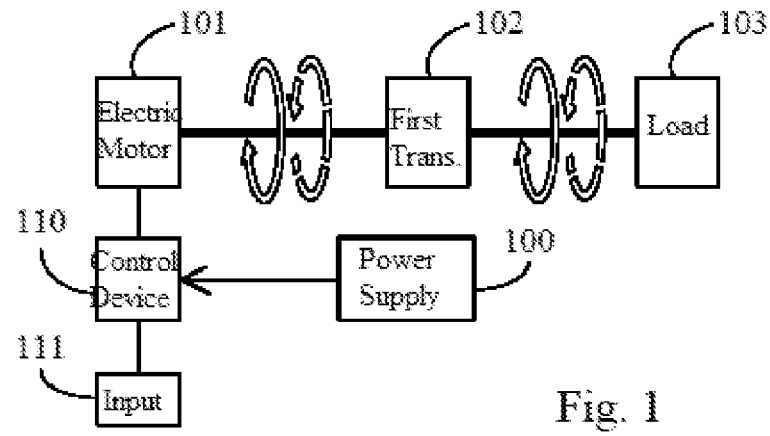
FIG. 1 is a block schematic view of basic structure of the bidirectional unequal speed electric motor driven bidirectional output system of the present invention.

100: Power supply device
101: Bidirectional unequal speed electric motor
102: Bidirectional same or different speed change ratio output transmission device
103: Rotating load
104: Transmission device
109: Bidirectional unequal speed electric motor load current detecting device
110: Bidirectional unequal speed electric motor operative control device
111: Input device

DETAILED DESCRIPTION OF THE PREFERRED EMBODIMENTS

The present invention is through the driving bidirectional positive or reverse rotation of the bidirectional unequal speed electric motor to drive the input end of bidirectional same or different speed change ratio output transmission device and it is further through the output end of the bidirectional same or different speed change ratio output transmission device to further operate different speed change ratio bidirectional rotating output for driving the rotating load while accepting different driving input direction and different rotating speed input from the bidirectional unequal speed electric motor, wherein the present invention can be applied in the bidirectional unequal speed electric motor driven carriers such as electric bicycles, electric motorcycles, or electric vehicles, or electric industrial machineries, tool machineries, or various electric tools or other electric motor driven loads.

FIG. 1 is a block schematic view of basic structure of the bidirectional unequal speed electric motor driven bidirectional output system of the present invention.

Figure 2:
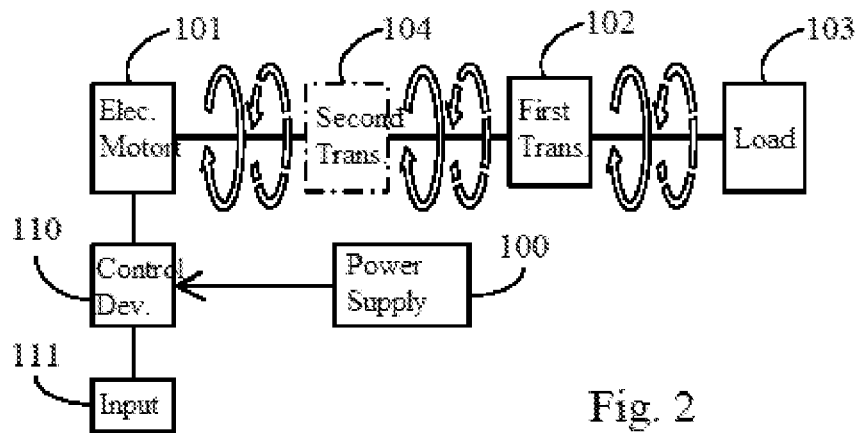
FIG. 2 is a block schematic view showing the driving system application example of FIG. 1, wherein a transmission device(104) is additionally installed between the bidirectional unequal speed electric motor(101) and the bidirectional same or different speed change ratio output transmission device(102).

FIG. 2 is a block schematic view showing the driving system application example of FIG. 1, wherein a transmission device(104) is additionally installed between the bidirectional unequal speed electric motor(110) and the bidirectional same or different speed change ratio output transmission device(102).

Figure 3:
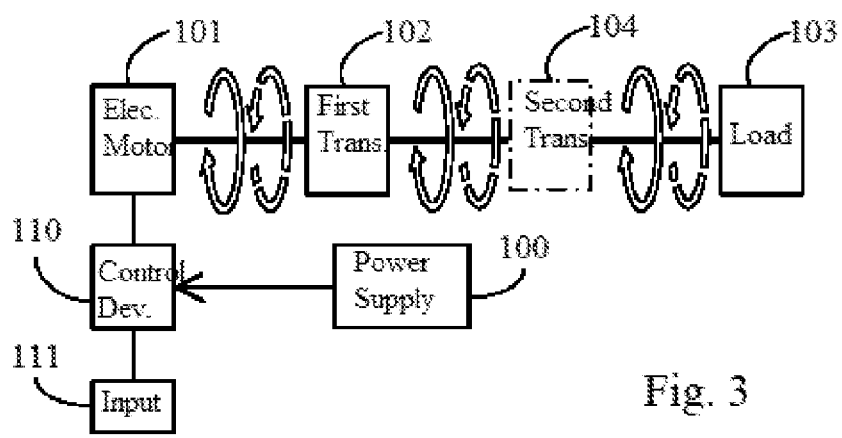
FIG. 3 is a block schematic view showing the driving system application example of FIG. 1, wherein a transmission device(104) is additionally installed between the bidirectional same or different speed change ratio output transmission device(102) and the driven rotating load(103).

FIG. 3 is a block schematic view showing the driving system application example of FIG. 1, wherein a transmission device(104) is additionally installed between the bidirectional same or different speed change ratio output transmission device(102) and the driven rotating load(103).

Figure 4:
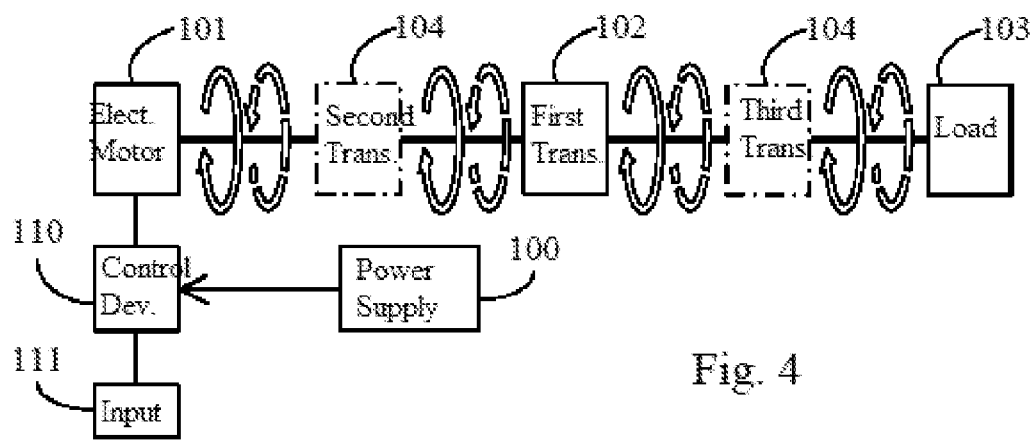
FIG. 4 is a block schematic view showing the driving system application example of FIG. 1, wherein a transmission device(104) is respectively additionally installed between the bidirectional unequal speed electric motor(101) and the bidirectional same or different speed change ratio output transmission device(102) as well as between bidirectional same or different speed change ratio output transmission device(102) and the driven rotating load(103).

FIG. 4 is a block schematic view showing the driving system application example of FIG. 1, wherein a transmission device(104) is respectively additionally installed between the bidirectional unequal speed electric motor(101) and the bidirectional same or different speed change ratio output transmission device(102) as well as between bidirectional same or different speed change ratio output transmission device(102) and the driven rotating load(103).

As shown in FIGS. 1, 2, 3 and 4, the bidirectional unequal speed electric motor driven bidirectional output system is through the operating signals or instructions sent by the input device(111) to allow the power of the power supply device (100) via the bidirectional unequal speed electric motor operative control device(110) to operate the bidirectional unequal speed electric motor(110) for the first driving rotating directional operation or the second different driving rotating directional operation, wherein the output rotating power from the output end of the bidirectional unequal speed electric motor(101) is transmitted to the input end of the bidirectional same or different speed change ratio output transmission device(102) directly or via the transmission device(104), thereby allowing the bidirectional same or different speed change ratio output transmission device having different speed change ratio to provide bidirectional different speed change ratio rotating output power while in different driving input direction for driving the rotating load(103) as shown in FIGS. 1~4, wherein:

The bidirectional unequal speed electric motor(101): It is constituted by various AC or DC, brushed or brushless, synchronous or asynchronous electric driven bidirectional unequal speed electric motor for unequal positive or reverse rotations;

The bidirectional unequal speed electric motor operative control device(110): It is constituted by electromechanical components or devices, or solid state electronic components or devices, or control circuits having microprocessor and relevant software for receiving the input from AC or DC power source of city power or generator, or the power of power supply device(100) such as fuel cells, primary batteries, or storage/discharge secondary batteries for turning on and off, and operating control the rotating direction, rotating speed and torque, as well as providing over-voltage, or over-current protection for the bidirectional unequal speed electric motor(101);

The input device(111): It sends out signals or instructions to bidirectional unequal speed electric motor operative control device(110) for turning on and off, operative controlling or setting the rotating direction, rotating speed and toque of the bidirectional unequal speed electric motor(101);

The input power of the first driving rotating direction and the second driving rotating direction of the bidirectional unequal speed electric motor(110) is used for driving the input end of the bidirectional same or different speed change ratio output transmission device(102), wherein the rotating speeds of the first rotating direction and the second rotating direction are different;

The first driving rotating direction and second driving rotating direction are contrary to each other;

The bidirectional same or different speed change ratio output transmission device(102): The bidirectional same or different speed change ratio output transmission device(102) is through receiving the rotating power of different rotating direction and different rotating speed from the bidirectional unequal speed electric motor (101) directly or via the transmission device(104) to output the bidirectional rotating directional power; the internal transmission components of the bidirectional same or different speed change ratio output transmission device(102) are constituted by one or more than one transmission components of the following: 1) gear train; or 2) friction wheel train; or 3) chain and sprocket train; or 4) belt and pulley train; or 5) transmission crankshaft or wheel train; or 6) fluid transmission device; or 7) electromagnetic transmission device; wherein the speed ratio of input end to the bidirectional rotating output end of the bidirectional same or different speed change ratio output transmission device(102) while being driven for the different rotating direction, i.e. first driving rotating directional operation and second driving rotating directional operation, can be the same or different, or the variable speed change ratio;

The rotating load(103): It is the bidirectional rotating load being driven by the output end of the bidirectional same or different speed change ratio output transmission device(102) directly or via the transmission device (104).

The bidirectional unequal speed electric motor driven bidirectional output system is further installed with the transmission device(104) on at least one of the following locations thereof: 1) the transmission device(104) is additionally installed between the bidirectional same or different speed change ratio output transmission device(102) and rotating load(103), or 2) the transmission device(104) is additionally installed between the bidirectional unequal speed electric motor(101) and bidirectional same or different speed change ratio output transmission device(102), or 3) the transmission devices(104) are additionally installed between the bidirectional unequal speed electric motor(101) and the bidirectional same or different speed change ratio output transmission device(102), as well as between the bidirectional same or different speed change ratio output transmission device (1102) and rotating load(1103);

The transmission device(104): The transmission device (104) is constituted by one or more than one transmission devices of the following: (1) various gear-type, belt-type, friction-type fixed speed ratio rotating type transmission functioning structure, or (2) the stepped or stepless variable speed device being operated manually, or by the mechanical force, or fluid force, or centrifugal force, or rotating torque or counter-rotating torque, or (3) the transmission device of operatively controllable the relative rotating directional relationships of switching between the input end and output end, or (4) the clutch device or the single way clutch being operated manually, or by the mechanical force, or electromagnetic force, or fluid force, or centrifugal force, or rotating torque, or counter-rotating torque for connecting transmission or interrupting transmission clutch functioning structure.

FIG. 2 is a block schematic view showing the driving system application example of FIG. 1, wherein a transmission device(104) is additionally installed between the bidirectional unequal speed electric motor(101) and the bidirectional same or different speed change ratio output transmission device(102).

FIG. 3 is a block schematic view showing the driving system application example of FIG. 1, wherein a transmission device(104) is additionally installed between the bidirectional same or different speed change ratio output transmission device(102) and the driven rotating load(103).

FIG. 4 is a block schematic view showing the driving system application example of FIG. 1, wherein a transmission device(104) is respectively additionally installed between the bidirectional unequal speed electric motor(101) and the bidirectional same or different speed change ratio output transmission device(102) as well as between the bidirectional same or different speed change ratio output transmission device(102) and the driven rotating load(103).

Aforesaid bidirectional unequal speed electric motor driven bidirectional output system is manually operated by the input device(111) to operatively control the rotating direction of the bidirectional unequal speed electric motor(101) through the bidirectional unequal speed electric motor operative control device(110).

Figure 5:
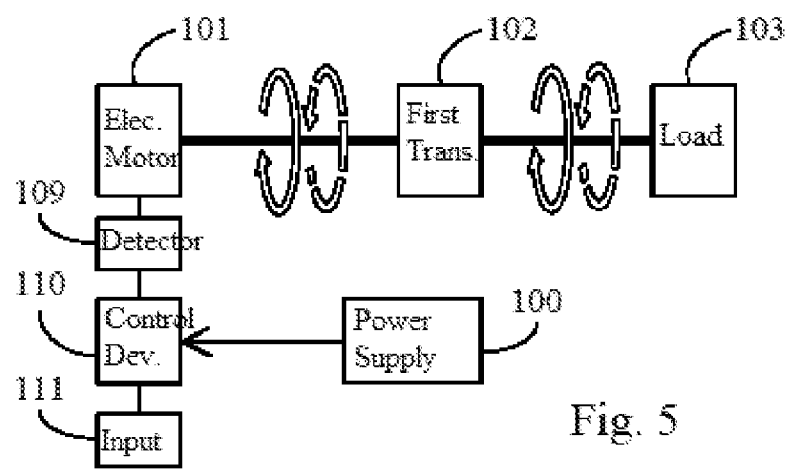
FIG. 5 is a block schematic view showing the bidirectional unequal speed electric motor driven bidirectional output system of the present invention is installed with the bidirectional unequal speed electric motor loading current detecting device.

Besides, the bidirectional unequal speed electric motor driven bidirectional output system is further additionally installed with the bidirectional unequal speed electric motor load current detecting device(109) to automatically switch the output speed ratio according to loading current;

FIG. 5 is a block schematic view showing the driving system application example of FIG. 1, wherein the bidirectional unequal speed electric motor driven bidirectional output system of the present invention is installed with the bidirectional unequal speed electric motor loading current detecting device.

Figure 6:
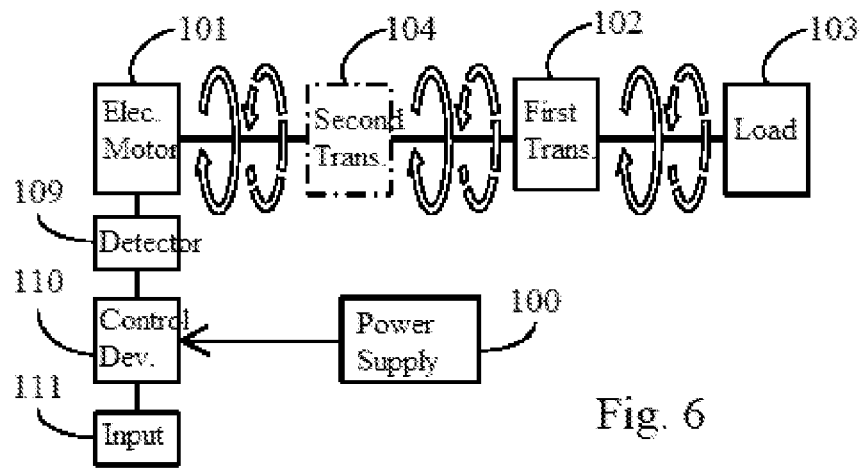
FIG. 6 is a block schematic view showing the driving system application example of FIG. 5, wherein a transmission device(104) is additionally installed between the bidirectional unequal speed electric motor(101) and the bidirectional same or different speed change ratio output transmission device(102).

FIG. 6 is a block schematic view showing the driving system application example of FIG. 5, wherein a transmission device(104) is additionally installed between the bidirectional unequal speed electric motor(101) and the bidirectional same or different speed change ratio output transmission device(102).

Figure 7:
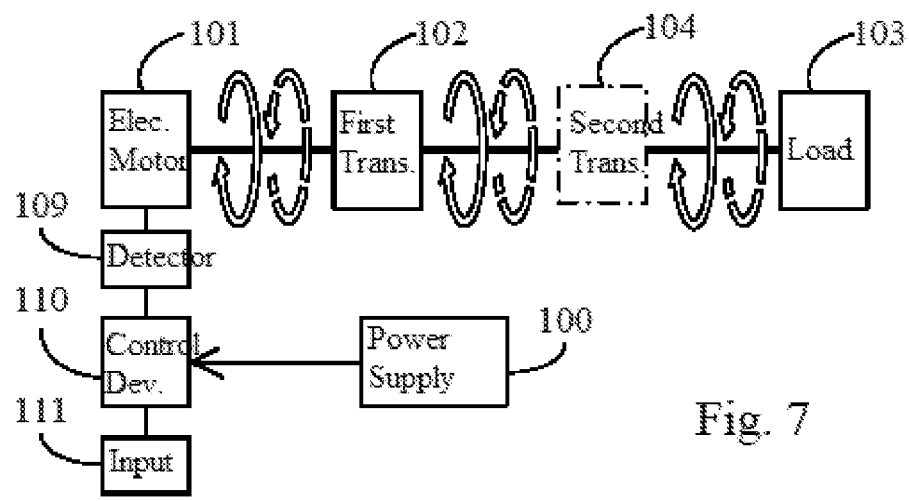
FIG. 7 is a block schematic view showing the driving system application example of FIG. 5, wherein a transmission device(104) is additionally installed between the bidirectional same or different speed change ratio output transmission device(102) and the driven rotating load(103).

FIG. 7 is a block schematic view showing the driving system application example of FIG. 5, wherein a transmission device(104) is additionally installed between the bidirectional same or different speed change ratio output transmission device(102) and the driven rotating load(103).

Figure 8:
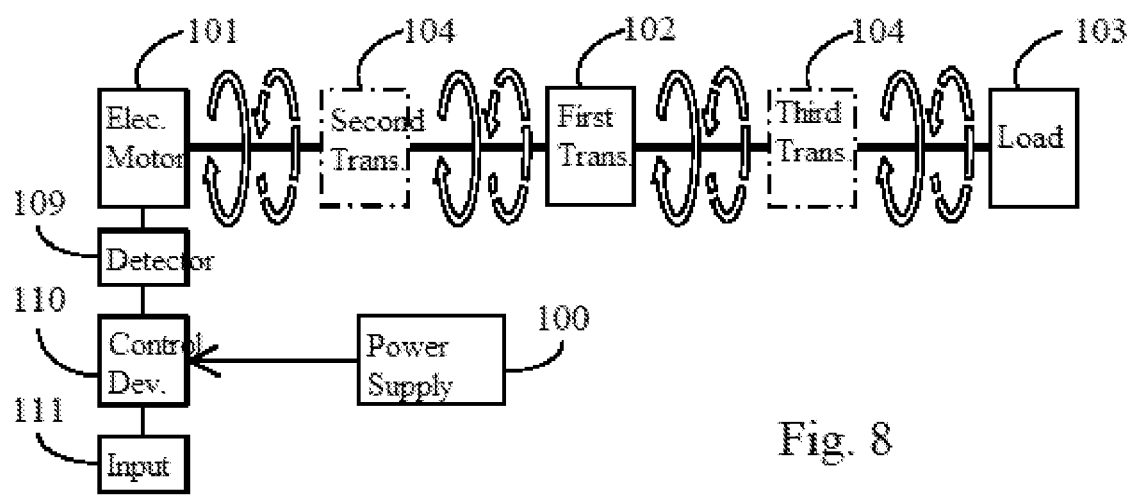
FIG. 8 is a block schematic view showing the driving system application example of FIG. 5, wherein a transmission device(104) is respectively additionally installed between the bidirectional unequal speed electric motor(101) and the bidirectional same or different speed change ratio output transmission device(102) as well as between bidirectional same or different speed change ratio output transmission device(102) and the driven rotating load(103).

FIG. 8 is a block schematic view showing the driving system application example of FIG. 5, wherein a transmission device(104) is respectively additionally installed between the bidirectional unequal speed electric motor(110) and the bidirectional same or different speed change ratio output transmission device(102) as well as between the bidirectional same or different speed change ratio output transmission device(102) and the driven rotating load(103).

As shown in aforesaid FIGS. 5~8, the bidirectional unequal speed electric motor driven bidirectional output system is further installed with the bidirectional unequal speed electric motor load current detecting device(109), wherein the bidirectional unequal speed electric motor load current detecting device(109) is constituted by the various reduced voltage type current detecting device, or electromagnetic inducting current detecting device, or magnetic detection type current detecting device, or heat accumulation type current detecting device to detect loading current of the bidirectional unequal speed electric motor(101) for feedback to the bidirectional unequal speed electric motor operative control device(110), when the state of the loading current of the bidirectional unequal speed electric motor(101) exceeding the predetermined value, and the state exceeding the predetermined time, the signal of the bidirectional unequal speed electric motor load current detecting device(109) is transmitted to the input device(111) or the bidirectional unequal speed electric motor operative control device(110) for changing the rotating direction of the bidirectional unequal speed electric motor(101) to further change the speed change ration of the bidirectional same or different speed change ratio output transmission device(102) thereby relatively increasing the speed reduction ratio so as to increase the output torque in the same rotating directional output to drive the load;

When the loading current of the bidirectional unequal speed electric motor(101) is returned to below the predetermined value, it can be operatively controlled to return to the original status by at least one of the two methods in the following:

1) The bidirectional unequal speed electric motor operative control device(110) is manually operatively controlled by the input device(111) to recover the bidirectional unequal speed electric motor(101) back to original rotating direction and drive the load at original speed ratio;
2) when the current detected by the bidirectional unequal speed electric motor load current detecting device(109) drops below the predetermined value, it is through the bidirectional unequal speed electric motor operative control device(110) to automatically select the load driving rotating speed at that time and relative to the speed ratio variation thereby to provide the load with the relative output power value of driving smoothly without disruption or sudden unexpected acceleration for driving the bidirectional unequal speed electric motor(101) smoothly back to the original rotating direction operation;

The bidirectional unequal speed electric motor driven bidirectional output system is further driven in different driving directions corresponding to different operating characteristic bidirectional outputs, wherein the rotating output direction switching is achieved by allowing one of the transmission devices(104) to be constituted by the transmission device having the output rotating direction and speed change ratio mechanical switching function.

For practical application of the bidirectional unequal speed electric motor driven bidirectional output system, each relevant device in aforesaid embodiments of the bidirectional unequal speed electric motor driven bidirectional output system is first individually independent and then transmissionly connected, or two or more than two of the relevant devices are integrally combined.

The invention claimed is:

1. A bidirectional unequal-speed electric motor-driven output system, comprising:

an electric motor having an output arranged to rotate in either of two directions at unequal speeds, whereby changing a rotating direction of the electric motor changes a rotating speed of the electric motor output;

an electric motor operative control device for the electric motor, said control device controlling at least a rotating direction of said electric motor;

an input device for providing instructions to said electric motor operative control device;

a first transmission device having a power input directly or indirectly connected to the output of said electric motor;

a rotating load having a power input directly or indirectly connected to the output of said first transmission device, wherein a rotating speed or torque of said power input to said load is controlled by changing a direction of said motor.

2. A bidirectional unequal-speed electric motor-driven output system as claimed in claim 1, further comprising a second transmission device connected between the output of the electric motor and the power input of the first transmission device.

3. A bidirectional unequal-speed electric motor-driven output system as claimed in claim 1, further comprising a second transmission device connected between an output of the first transmission device and the power input of the rotating load.

4. A bidirectional unequal-speed electric motor-driven output system as claimed in claim 1, further comprising a second transmission device connected between the output of the electric motor and the power input of the first transmission device, and a third transmission device connected between an output of the first transmission device and the power input of the rotating load.

5. A bidirectional unequal-speed electric motor-driven output system as claimed in claim 1, wherein the first transmission device includes at least one of a gear train, friction wheel train, chain and sprocket train, belt and pulley train, transmission crankshaft, wheel train, fluid transmission device, and electromagnetic transmission device.

6. A bidirectional unequal-speed electric motor-driven output system as claimed in claim 5, wherein said first transmission device has a same speed change ratio for different rotating directions of said electric motor output.

7. A bidirectional unequal-speed electric motor-driven output system as claimed in claim 5, wherein said first transmission device has different speed change ratios that depend on said electric motor output.

8. A bidirectional unequal-speed electric motor-driven output system as claimed in claim 1, further comprising at least one additional transmission device installed between the first transmission device and either or both of the electric motor and the rotating load, wherein the second transmission device includes at least one of the following devices: (a) a gear-type, belt-type, or friction-type fixed-speed-ratio transmission device; (b) a stepped or stepless variable speed device operated manually, by mechanical force, by fluid force, by centrifugal force, or by rotating or counter-rotating torque; (c) a transmission device having an operatively controllable relative directional relationship between input and output ends; and (d) a clutch device operated manually, by mechanical force, by fluid force, by centrifugal force, or by rotating or counter-rotating torque.

9. A bidirectional unequal-speed electric motor-driven output system as claimed in claim 1, further comprising a current-detecting device for detecting an electric motor load current by detecting voltage, electromagnetic induction, a magnet field, or heat accumulation, said current-detecting device providing feedback to the electric motor operative control device,
wherein when a load current exceeds a predetermined value for a predetermined time, the electric motor operative control device changes a rotating direction of said electric motor output to a rotating direction that provides an increased electric motor output speed and increased rotating speed or torque to said power input of said load.

10. A bidirectional unequal-speed electric motor-driven output system as claimed in claim 9, wherein when the load current falls below said predetermined value, said electric motor is either manually controlled through the input device, or automatically controlled through the electric motor operative control device, to return to an original rotating direction.

11. A bidirectional unequal-speed electric motor-driven output system as claimed in claim 1, wherein said first transmission device is a separate device from said electric motor.

12. A bidirectional unequal-speed electric motor-driven output system as claimed in claim 1, wherein said first transmission device is integral with said electric motor.

13. A bidirectional unequal-speed electric motor-driven output system as claimed in claim 1, wherein said first transmission device and a second transmission device are integral with said electric motor.

* * * * *